(12) United States Patent
Maejima et al.

(10) Patent No.: US 10,589,576 B2
(45) Date of Patent: Mar. 17, 2020

(54) STUD TIRE

(71) Applicant: THE YOKOHAMA RUBBER CO., LTD., Minato-Ku, Tokyo (JP)

(72) Inventors: Keisuke Maejima, Hiratsuka (JP); Satoshi Mihara, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 328 days.

(21) Appl. No.: 15/129,764

(22) PCT Filed: Mar. 31, 2015

(86) PCT No.: PCT/JP2015/060150
§ 371 (c)(1),
(2) Date: Sep. 27, 2016

(87) PCT Pub. No.: WO2015/152250
PCT Pub. Date: Oct. 8, 2015

(65) Prior Publication Data
US 2017/0144490 A1 May 25, 2017

(30) Foreign Application Priority Data

Mar. 31, 2014 (JP) .................................. 2014-071508

(51) Int. Cl.
*B60C 11/16* (2006.01)
*B60C 1/00* (2006.01)
(Continued)

(52) U.S. Cl.
CPC ............ *B60C 11/1637* (2013.01); *B60C 1/00* (2013.01); *B60C 1/0016* (2013.01); *B60C 11/00* (2013.01);
(Continued)

(58) Field of Classification Search
CPC ....................................................... B60C 11/16
See application file for complete search history.

(56) References Cited

FOREIGN PATENT DOCUMENTS

| JP | 2008-207743 A | 9/2008 |
|---|---|---|
| JP | 2009-023602 A | 2/2009 |

(Continued)

OTHER PUBLICATIONS

English machine translation of JP2013-023537 (Year: 2013).*

(Continued)

*Primary Examiner* — Robert C Dye
(74) *Attorney, Agent, or Firm* — Carrier Blackman & Associates, P.C.; Joseph P. Carrier; Anne G. Sabourin

(57) ABSTRACT

A studded tire includes stud pins embedded in a road contact surface of a tread portion 1; the rubber composition forming the tread portion containing at least one of natural rubber, styrene-butadiene rubber, and butadiene rubber, from 5 to 50 parts by weight of carbon black and from 5 to 70 parts by weight of silica per 100 parts by weight of the diene rubber; a nitrogen adsorption specific surface area of the carbon black being from 50 to 120 $m^2/g$; a CTAB specific surface area of the silica being from 80 to 190 $m^2/g$; a rubber hardness of the rubber composition being not greater than 60; and a product of a stress at the time of 400% elongation and a bottom surface area of a flange portion on a bottom side of the stud pins being not less than 400 MPa·$mm^2$ and not greater than 850 MPa·$mm^2$.

4 Claims, 3 Drawing Sheets

(51) Int. Cl.

| | |
|---|---|
| *B60C 11/11* | (2006.01) |
| *C08K 3/04* | (2006.01) |
| *B60C 11/00* | (2006.01) |
| *C08K 3/36* | (2006.01) |
| *C08L 91/06* | (2006.01) |
| *C08L 91/00* | (2006.01) |
| *C08L 9/06* | (2006.01) |
| *B60C 11/12* | (2006.01) |
| *C08L 7/00* | (2006.01) |
| *C08L 9/00* | (2006.01) |
| *C08K 9/10* | (2006.01) |
| *C08K 5/01* | (2006.01) |

(52) U.S. Cl.
CPC ........... *B60C 11/11* (2013.01); *B60C 11/1204* (2013.01); *B60C 11/16* (2013.01); *B60C 11/1625* (2013.01); *B60C 11/1656* (2013.01); *B60C 11/1668* (2013.01); *C08K 3/04* (2013.01); *C08K 3/36* (2013.01); *C08L 7/00* (2013.01); *C08L 9/00* (2013.01); *C08L 9/06* (2013.01); *C08L 91/00* (2013.01); *C08L 91/06* (2013.01); *B60C 2011/1213* (2013.01); *C08K 5/01* (2013.01); *C08K 9/10* (2013.01); *C08K 2201/006* (2013.01); *C08L 2205/02* (2013.01); *C08L 2205/03* (2013.01)

(56) References Cited

FOREIGN PATENT DOCUMENTS

| | | |
|---|---|---|
| JP | 2010-070052 A | 4/2010 |
| JP | 2012-030690 A | 2/2012 |
| JP | 2013-023537 A | 2/2013 |

OTHER PUBLICATIONS

English machine translation of JP2008-207743 (Year: 2008).*
English machine translation of JP2010-070052 (Year: 2010).*
English machine translation of JP2009-023602 (Year: 2009).*
English machine translation of JP2012-030690 (Year: 2012).*

* cited by examiner

STUD TIRE

TECHNICAL FIELD

The present invention relates to a studded tire having a stud pin embedded in a tread portion, and more particularly to a studded tire having enhanced stud pin retention capacity.

BACKGROUND ART

In areas with severe winters such as North America and Russia, studded tires are primarily used as winter tires. Conventionally, in a studded tire, a plurality of implanting holes for embedding stud pins are provided in a tread portion, and stud pins are embedded in these implanting holes. Implanting holes are ordinarily formed into a cylindrical shape. On the other hand, there are single flange type stud pins having a flange portion on the bottom side of a cylindrical body portion so that the flange portion bulges to a greater degree than the body portion, and double flange type stud pins having flange portions on the road contact surface side and the bottom side of a cylindrical body portion so that the flange portions bulge to a greater degree than the body portion, but double flange type stud pins have become mainstream in recent years (for example, see Japanese Unexamined Patent Application Publication No. 2010-70052A). The performance of a studded tire is exhibited by the stud pins embedded in the tread portion, but when the stud pins fall off, the reduction in performance on snow and ice is marked, so a countermeasure against pin dropping has become an important issue.

In recent years, increases in safety awareness in the market have led to greater demands for performance on snow and ice and wet performance in studded tires. Therefore, there is a demand to suppress the falling off of stud pins—that is, to improve the stud pin retention capacity beyond conventional levels.

SUMMARY OF INVENTION

Technical Problem

An object of the present invention is to provide a studded tire in which the stud pin retention capacity is increased and the performance on snow and ice and the wet performance are enhanced beyond conventional levels.

Solution to Problem

The studded tire of the present invention which achieves this object is a studded tire having stud pins embedded in a road contact surface of a tread portion formed from a rubber composition; the rubber composition containing a diene rubber containing at least one rubber selected from natural rubber, styrene-butadiene rubber, and butadiene rubber, from 5 to 50 parts by weight of carbon black and from 5 to 70 parts by weight of silica per 100 parts by weight of the diene rubber; a glass transition temperature of the diene rubber being not higher than −60° C.; a nitrogen adsorption specific surface area of the carbon black being from 50 to 120 m$^2$/g; a CTAB (cetyltrimethyl ammonium bromide) specific surface area of the silica being from 80 to 190 m$^2$/g; a rubber hardness of the rubber composition being not greater than 60; and a product (S×A) of a stress S (MPa) at the time of 400% elongation and a bottom surface area A (mm$^2$) of a flange portion on a bottom side of the stud pins being not less than 400 and not greater than 850.

Advantageous Effects of Invention

As the rubber composition forming the tread portion of the studded tire of the present invention, a specific carbon black and silica are blended into a diene rubber having a glass transition temperature of not higher than −60° C. selected from natural rubber, styrene-butadiene rubber, and butadiene rubber, wherein the rubber hardness of the rubber composition is not greater than 60, and the product (S×A) of the stress S (MPa) at the time of 400% elongation and the bottom surface area A (mm$^2$) of the flange portion on the bottom side of the stud pins is not less than 400 and not greater than 850. Therefore, it is possible to obtain a studded tire in which the stud pin retention capacity is further increased and the performance on snow and ice and wet performance of the studded tire are equal to or better than conventional levels.

The pull-out force required to pull out the stud pins of this studded tire from the tread portion should be not less than 170 N, which makes it possible to further reduce the falling off of the stud pins.

The rubber composition forming the tread portion should further contain from 0.1 to 10 parts by weight of thermally expandable microcapsules per 100 parts by weight of the diene rubber. This makes it possible to further enhance the performance on snow and ice and the wet performance of the studded tire.

DESCRIPTION OF EMBODIMENTS

Figure 1:
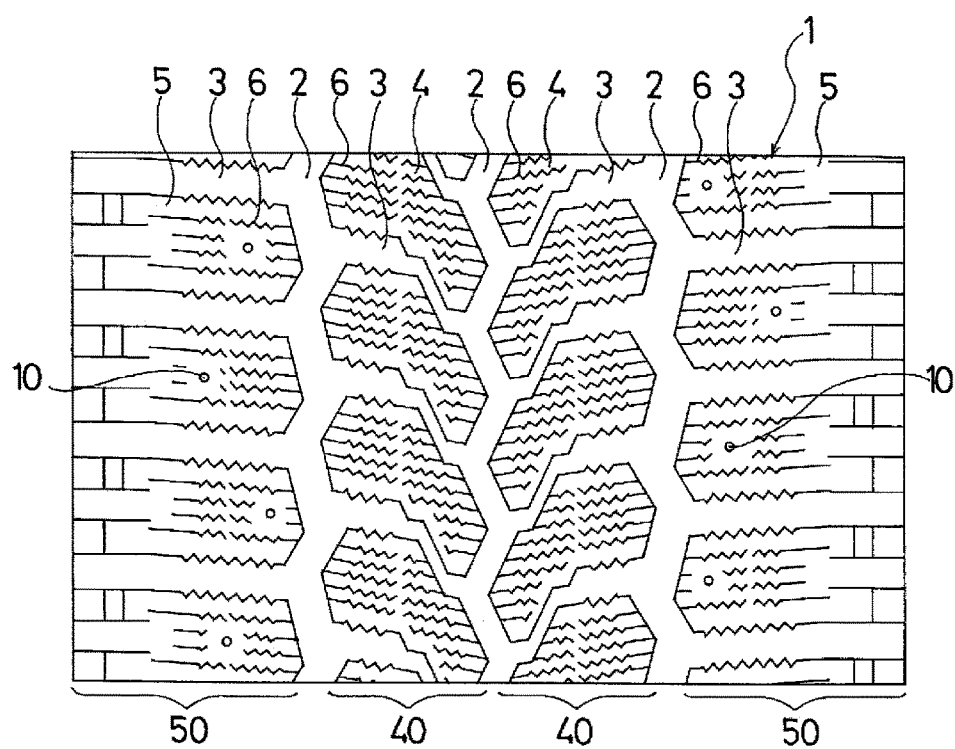
FIG. 1 is a developed view illustrating a tread pattern of a studded tire (prior to stud pin driving) according to an embodiment of the present invention.
Figure 2:
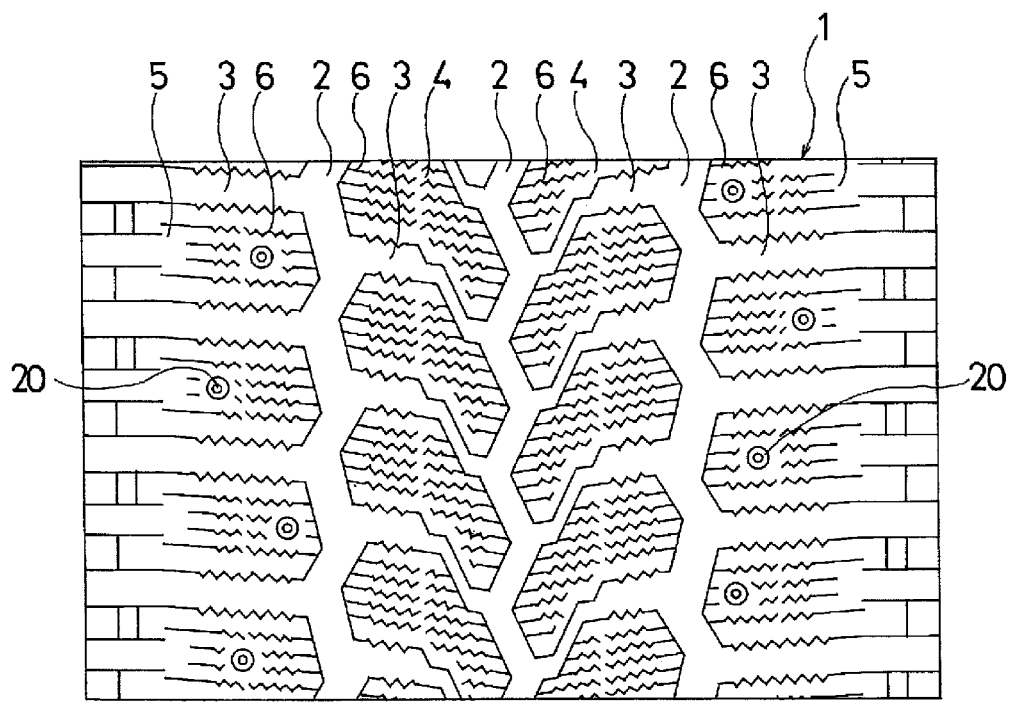
FIG. 2 is a developed view illustrating a tread pattern of a studded tire (after stud pin driving) according to an embodiment of the present invention.

FIG. 1 illustrates a tread pattern prior to stud pin driving according to an embodiment of the studded tire of the present invention, and FIG. 2 illustrates an example of the tread pattern after stud pins are driven into the tire of FIG. 1.

As illustrated in FIGS. 1 and 2, a plurality of vertical grooves 2 extending in a zigzag pattern in the tire circumferential direction and a plurality of horizontal grooves 3 extending in the tire width direction are formed in a tread portion 1. Rows of blocks 40 on the tread center side comprising a plurality of blocks 4 and rows of blocks 50 on the shoulder side comprising a plurality of blocks 5 are partitioned by these vertical grooves 2 and horizontal grooves 3.

A plurality of sipes 6 extending in a zigzag pattern in the tire width direction are formed in each of the blocks 4 of the rows of blocks 40 on the tread center side and the blocks 5 of the rows of blocks 50 on the shoulder side. Furthermore, implanting holes 10 for stud pins are formed together with the plurality of sipes 6 in the blocks 5 of the row of blocks 50 on the shoulder side. The sipes 6 are positioned at sites avoiding the implanting holes 10. In FIG. 2, a stud pin 20 is embedded in each implanting hole 10. The stud pins 20 is embedded by inserting stud pins 20 into the implanting holes 10 when the implanting holes 10 are in an expanded state, and then releasing the expansion of the implanting holes 10.

Figure 3:
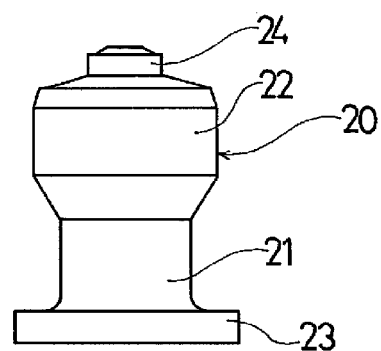
FIG. 3 is a side view illustrating an example of a stud pin constituting the studded tire of the present invention.
Figure 4:
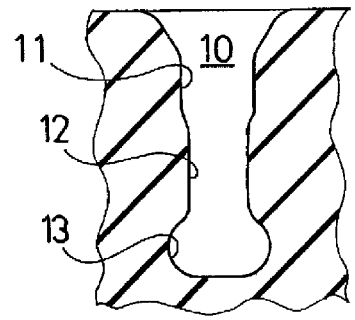
FIG. 4 is a cross-sectional view illustrating an example of an implanting hole formed in the tread portion of the studded tire.
Figure 5:
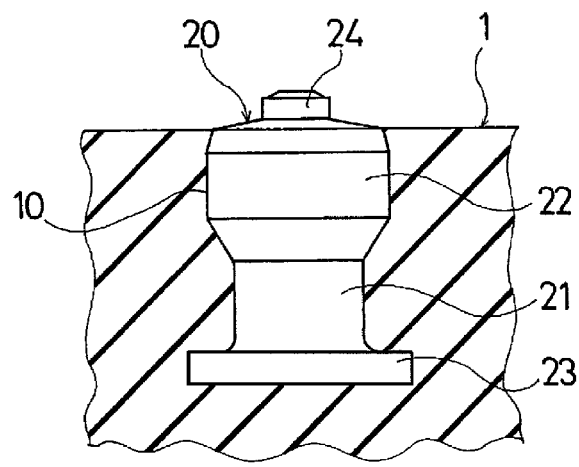
FIG. 5 is a cross-sectional view illustrating a state in which the stud pin of FIG. 3 is embedded in the implanting hole of FIG. 4.

FIG. 3 is a side view illustrating a stud pin 20 constituting the present invention. FIG. 4 is a cross-sectional view illustrating an implanting hole 10 formed in the tread portion. FIG. 5 is a cross-sectional view illustrating a state in which the stud pin of FIG. 3 is embedded in the implanting hole of FIG. 4. In these illustrated examples, a double flange type stud pin is described as a stud pin, but single flange type stud pins may also be used for the studded tire of the present invention.

As illustrated in FIG. 3, the stud pin 20 comprises a cylindrical body portion 21, a road contact surface side flange portion 22, a bottom side flange portion 23, and a tip portion 24. The road contact surface side flange portion 22 is formed on the road contact surface side (outer side in the tire radial direction) of the body portion 21 so that the diameter of the road contact surface side flange portion 22 is larger than that of the body portion 21. The tip portion 24 is formed from a material that is harder than the material of other constituent members so as to project in the pin axial direction from the road contact surface side flange portion 22. The bottom side flange portion 23 is formed on the bottom side (inner side in the tire radial direction) of the body portion 21 so that the diameter of the bottom side flange portion 23 is larger than that of the body portion 21.

On the other hand, as illustrated in FIG. 4, the implanting hole 10 comprises an upper side cylindrical portion 11 disposed at a position corresponding to the road contact surface side flange portion 22 of the stud pin 20, a lower side cylindrical portion 12 disposed at a position corresponding to the body portion 21 of the stud pin 20, and a bottom portion 13 adjacent to the lower side cylindrical portion 12. Here, the inside diameters of the upper side cylindrical portion 11 and the bottom 13 are respectively greater than the inside diameter of the lower side cylindrical portion 12.

In the case of a single flange type stud pin, the diameter of the road contact surface side flange portion 22 may be the same as the diameter of the cylindrical body portion 21. In addition, for an implanting hole corresponding to the single flange type as well, the inside diameter of the upper side cylindrical portion 11 may be the same as the inside diameter of the lower side cylindrical portion 12.

For both double flange type and single flange type stud pins, the diameter of the bottom side flange portion 23 is made to be greater than the diameter of the cylindrical body portion 21. The inside diameter of the lower cylindrical portion 12 is made to be smaller than the inside diameter of the bottom portion 13 of the implanting hole.

As illustrated in FIG. 5, when the stud pin 20 is implanted in the implanting hole 10 provided in the tread portion, the constricted lower side cylindrical portion 12 of the implanting hole 10 tighten the stud pin 20 so that the stud pin 20 is difficult to remove. Since the diameter of the bottom side flange portion 23 of the stud pin 20 is made to be larger than the inside diameter of the lower side cylindrical portion 12, the stud pin 20 is even more difficult to remove.

The ratio (D/d) of the diameter D of the bottom side flange portion 23 of the stud pin 20 to the inside diameter d of the lower side cylindrical portion 12 of the implanting hole 10 is not particularly limited but is preferably from 2.5 to 5.5 and more preferably from 3.0 to 4.0. Setting the ratio (D/d) to within such a range makes it possible to suppress the falling off of the stud pin.

In the studded tire of the present invention, the tread portion is formed from a specified rubber composition. This rubber composition (also called a "rubber composition for the tire tread" hereafter) contains at least one rubber selected from natural rubber, styrene-butadiene rubber, and butadiene rubber and contains these rubbers as the main components thereof. Containing these rubbers as the main components means that the rubber composition contains not less than a total of 50 wt. % of natural rubber and/or styrene-butadiene rubber and/or butadiene rubber with respect to 100 wt. % of the diene rubber. By using these rubbers the main components, the performance on snow and ice and the wet performance of the rubber composition can be enhanced. The total content of the natural rubber, styrene-butadiene rubber, and butadiene rubber is preferably from 50 to 100 wt. % and more preferably from 70 to 100 wt. %.

In the present invention, the rubber composition may contain a diene rubber other than natural rubber, styrene-butadiene rubber, and butadiene rubber. Examples of other diene rubbers include isoprene rubber, acrylonitrile butadiene rubber, butyl rubber, ethylene-α-olefin rubber, and chloroprene rubber. The content of the other diene rubber is preferably from 0 to 50 wt. % and more preferably from 0 to 30 wt. % in 100 wt. % of the diene rubber.

In the present invention, the glass transition temperature (Tg) of the diene rubber comprising natural rubber, styrene-butadiene rubber, and butadiene rubber is set to not higher than $-60°$ C., preferably from $-100°$ C. to $-60°$ C., and more preferably from $-90°$ C. to $-70°$ C. By setting the glass (Tg) of the diene rubber to not higher than $-60°$ C., it is possible to ensure the flexibility of the tread portion of the studded tire in low-temperature conditions and to enhance the performance on snow and ice and the wet performance.

In this specification, the glass transition temperature (Tg) of the diene rubber is the total (weight average value of the glass transition temperature) determined by multiplying the glass transition temperature of the constituent diene rubbers by the weight ratio of each diene rubber. The total weight ratio of all of the diene rubbers is set to 1. In addition, the glass transition temperature (Tg) of each diene rubber is the glass transition temperature of the diene rubber in a state in which an oil-extended component (oil) is not contained. For the glass transition temperature (Tg) of the diene rubber, differential scanning calorimetry (DSC) is performed at a rate of temperature increase of $20°$ C./minute to obtain a thermogram, and the temperature at the midpoint of the transition region is defined as the glass transition temperature.

The rubber composition constituting the tread portion contains from 5 to 50 parts by weight of carbon black having a nitrogen adsorption specific surface area from 50 to 120 $m^2/g$ and from 5 to 70 parts by weight of silica having a CTAB specific surface area of from 80 to 190 $m^2/g$ per 100 parts by weight of the diene rubber described above.

The nitrogen adsorption specific surface area of the carbon black is from 50 to 120 $m^2/g$ and preferably from 70 to 110 $m^2/g$. When the nitrogen adsorption specific surface area of the carbon black is less than 50 $m^2/g$, the wear resistance of the rubber composition is diminished. When the nitrogen adsorption specific surface area of the carbon black exceeds 120 $m^2/g$, the heat buildup of the rubber worsens. In this specification, the nitrogen adsorption specific surface area of the carbon black is measured on the basis of JIS (Japanese Industrial Standard) K6217-2.

The compounded amount of the carbon black is from 5 to 50 parts by weight and preferably from 20 to 50 parts by weight per 100 parts by weight of the diene rubber. When the compounded amount of the carbon black is less than 5 parts by weight, it is not possible to achieve the desired black colored rubber composition. When the compounded amount of the carbon black exceeds 50 parts by weight, the heat buildup of the rubber composition worsens.

The CTAB specific surface area of the silica is from 80 to 190 $m^2/g$ and preferably from 100 to 180 $m^2/g$. When the CTAB specific surface area of the silica is less than 80 $m^2/g$, the wear resistance is diminished. When the CTAB specific surface area of the silica exceeds 190 $m^2/g$, the heat buildup of the rubber composition worsens. In this specification, the CTAB specific surface area of the silica is measured on the basis of JIS K6217-3.

A compounded amount of the silica is from 5 to 70 parts by weight and preferably from 10 to 50 parts by weight per 100 parts by weight of the diene rubber. When the compounded amount of the silica is less than 5 parts by weight, the heat buildup worsens. When the compounded amount of the silica exceeds 70 parts by weight, the extrudability of the rubber composition is diminished.

The rubber composition for a tire tread may contain a silane coupling agent. By compounding a silane coupling agent, it is possible to improve the dispersibility of the silica in the diene rubber and to increase the reinforcing property with the rubber.

The compounded amount of the silane coupling agent is preferably from 3 to 15 wt. % and more preferably from 5 to 10 wt. % with respect to the compounded amount of the silica. When the compounded amount of the silane coupling agent is less than 3 wt. %, it is not possible to sufficiently improve the dispersion of the silica. When the compounded amount of the silane coupling agent exceeds 15 wt. % of the silica compounded amount, it is not possible to achieve the desired hardness, strength, or wear resistance.

The type of the silane coupling agent is not particularly limited as long as the silane coupling agent can be used in a rubber composition having silica blended therein, and examples thereof include sulfur-containing coupling agents such as bis-(3-triethoxysilylpropyl)tetrasulfide, bis-(3-triethoxysilylpropyl)disulfide, 3-trimethoxysilylpropyl benzothiazole tetrasulfide, γ-mercaptopropyl triethoxysilane, and 3-octanoylthiopropyl triethoxysilane.

The rubber composition for a tire tread may also contains other fillers other than carbon black and silica as long as they do not hinder the object of the present invention. Examples of the other fillers include clay, mica, talc, calcium carbonate, aluminum hydroxide, aluminum oxide, and titanium oxide.

The rubber composition constituting the tread portion of the studded tire may contain thermally expandable microcapsules in an amount of preferably from 0.1 to 10 parts by weight and more preferably from 0.5 to 7 parts by weight per 100 parts by weight of the diene rubber. When the compounded amount of the thermally expandable microcapsules is less than 0.1 parts by weight, the volume of hollow particles (microcapsule shells) in which the thermally expandable microcapsules expand at the time of vulcanization is insufficient, which may make it impossible to sufficiently improve the frictional performance on ice. When the compounded amount of the thermally expandable microcapsules exceeds 10 parts by weight, the wear resistance of the tread rubber may be diminished.

The thermally expandable microcapsules have a structure in which a thermally expandable substance is encapsulated in a shell material formed from a thermoplastic resin. Therefore, when the thermally expandable microcapsules dispersed in the rubber composition are heated at the time of the vulcanization molding of an unvulcanized tire, the thermally expandable substance encapsulated in the shell material expands so as to increase the particle size of the shell material and to form multiple hollow particles in the tread rubber. As a result, a water film generated on the surface of ice is effectively absorbed and removed, and a micro-edge effect is achieved, so the performance on ice is enhanced. The shell material of the microcapsules is harder than the tread rubber and can therefore enhance the wear resistance of the tread portion. The shell material of the thermally expandable microcapsules can be formed from a nitrile-based polymer.

The thermally expandable substance encapsulated in the shell material of the microcapsules has the property of vaporizing or expanding due to heat, and an example thereof is at least one type selected from the group consisting of hydrocarbons such as isoalkanes and normal alkanes. Examples of the isoalkanes include isobutane, isopentane, 2-methylpentane, 2-methylhexane, and 2,2,4-trimethylpentane, and examples of normal alkanes include n-butane, n-propane, n-hexane, n-heptane, and n-octane. These hydrocarbons may each be used alone, or a plurality thereof may be used in combination. As a preferred form of a thermally expandable substance, a substance in which a hydrocarbon which is a gas at room temperature is dissolved in a hydrocarbon which is a liquid at room temperature may be used. By using a mixture of such hydrocarbons, it is possible to achieve sufficient expansion power from a low temperature region to a high temperature region within the vulcanization molding temperature range (150 to 190° C.) of an unvulcanized tire.

The rubber composition for use in tire treads may also contain various compounding agents that are commonly used in rubber compositions for use in tire treads. Examples thereof include vulcanization or cross-linking agents, vulcanization accelerators, antiaging agents, plasticizers, processing aids, liquid polymers, and thermosetting resins. These compounding agents can be kneaded by a common method to obtain a rubber composition that can then be used for vulcanization or cross-linking. These compounding agents can be compounded in typical amounts conventionally used so long as the objects of the present invention are not hindered. The rubber composition for a tire tread can be produced by mixing the above-mentioned components using a well-known rubber kneading machine such as a Banbury mixer, a kneader, a roller, or the like. The prepared rubber composition can be used in the tread portion of a studded tire and vulcanization-molded by an ordinary method.

The rubber hardness of the rubber composition of the vulcanization-molded tread portion is not greater than 60, preferably from 40 to 60, and more preferably from 45 to 55. By setting the rubber hardness of the rubber composition to not less than 60, the performance on ice of the rubber composition is enhanced. The rubber hardness as used herein refers to the rubber hardness measured in accordance with JIS K6253 using a type A durometer at a temperature of 25° C.

In the studded tire of the present invention, the product (S×A) of the stress S (MPa) at the time of 400% elongation of the rubber composition and the bottom surface area A ($mm^2$) of the bottom side flange portion 23 of the stud pin 20 is not less than 400 and not greater than 850 and is preferably from 450 to 700. When the product (S×A) is less than 400, it is not possible to sufficiently suppress the dropping of the stud pins. When the product (S×A) exceeds 850, the rigidity of the rubber composition after vulcanization becomes too high. Here, the stress at the time of 400% elongation of the rubber composition refers to a value determined by measuring the stress (MPa) at the time of 400% elongation on the basis of JIS K6251.

The bottom surface area A (mm$^2$) of the bottom side flange portion 23 of the stud pin 20 is not particularly limited as long as the relationship described above is satisfied, but the bottom surface area A is preferably from 40 to 80 mm$^2$ and more preferably from 50 to 70 mm$^2$. The bottom surface area A (mm$^2$) of the bottom side flange portion 23 is the maximum cross-sectional area among the areas of cross sections perpendicular to the pin axial direction of the bottom side flange portion 23.

The studded tire of the present invention is obtained by vulcanization-molding a tire in which stud pins have not driven and then embedding stud pins 20 in implanting holes 10 formed in the tread portion of the obtained tire. The pull-out force required to pull out the implanted stud pins from the tread portion is preferably not less than 170 N, more preferably from 170 to 600 N, and even more preferably from 200 to 500 N. By setting the pull-out force of the stud pins to not less than 170 N, it is possible to make it even more difficult to remove the stud pins at the time of the actual use of the studded tire.

The present invention is further described below using examples. However, the scope of the present invention is not limited to these examples.

EXAMPLES

Using the compounding agents shown in Table 2 as common components, eight types of rubber compositions shown in Table 1 (Working Examples 1 to 4 and Comparative Examples 1 to 4) were prepared by kneading the components excluding sulfur, the vulcanization accelerator, and the thermally expandable microcapsules in a 1.8 L sealed mixer for 5 minutes, discharging and cooling the mixture, adding sulfur, a vulcanization accelerator, and thermally expandable microcapsules to the mixture, and mixing the components with an open roll. In Table 1, the styrene-butadiene rubber (SBR) contains 37.5 parts by weight of an oil-extended component, so the net compounded amount of rubber in the SBR is shown in parentheses together with the compounded amount including the oil-extended component. Furthermore, the compounded amounts of the compounding agents shown in Table 2 are expressed as parts by weight per 100 parts by weight of the diene rubbers shown in Table 1.

The eight types of obtained rubber compositions were press-vulcanized in a prescribed mold at 170° C. for 10 minutes to fabricate test pieces made of rubber compositions for a tread. The rubber hardness, the stress [S (MPa)] at the time of 400% elongation, the tan δ at 0° C., and the frictional performance on ice (inside drum test on ice: μ locks) of the resulting test pieces were measured in accordance with the methods described below.

Rubber Hardness

The rubber hardness of the test piece was measured in accordance with JIS K6253 using a type A durometer at a temperature of 25° C. The obtained results are shown in the "Rubber hardness" rows of Table 1.

Stress at the Time of 400% Elongation

JIS No. 3 dumbbell test pieces were cut out of the obtained test pieces in accordance with JIS K6251. The stress at the time of 400% deformation was measured in accordance with JIS K6251. The obtained results are shown in the "M400 (S)" rows of Table 1.

Tan δ at 0° C.

Using a viscoelastic spectrometer, manufactured by Toyo Seiki Seisakusho, Ltd., dynamic viscoelasticity of the obtained test piece was measured at an initial strain of 10%, an amplitude of ±2%, and a frequency of 20 Hz, and the tan δ at a temperature of 0° C. was calculated. The obtained results are shown as an index using the value of Comparative Example 1 as 100 and are shown in the "tan δ (0° C.)" rows of Table 1. A larger index indicates superior wet performance Frictional Performance on Ice (Inside Drum Test on Ice: μ Locks)

The obtained test piece was attached to a substrate rubber in the form of a flat column, and the coefficient of friction on ice was measured using an inside drum-type friction on ice tester under conditions with a measurement temperature of −1.5° C., a load of 5.5 kg/cm$^2$, and a drum rotation speed of 25 km/h. The obtained results are shown as an index using the value of Comparative Example 1 as 100 and are shown in the "Performance on snow and ice" rows of Table 1. A larger index value indicates superior performance on snow and ice.

The eight types of obtained rubber compositions were press-vulcanized in a mold with a prescribed shape having implanting holes at 170° C. for 10 minutes to fabricate test pieces with implanting holes made of rubber compositions for a tread. Stud pins having a bottom side flange portion area of 48 mm$^2$ (A=48 mm$^2$) were embedded in the obtained test pieces with implanting holes to produce test pieces with stud pins. The obtained test pieces with stud pins were used to measure the pull-out force of the stud pins with the following method.

Stud Pin Pull-Out Force

After the tip parts of a stud pin were removed, a screw hole was formed in the top part thereof, and a male screw having a tong hold was fitted into the hole. Stud pins processed in this way were embedded in the test pieces with implanting holes formed above, and after the conditions were adjusted, the test pieces were placed in a tension tester to measure the pull-out force of the stud pins. The obtained results are shown in the "Pull-out force" rows of Table 1.

TABLE 1

|  |  | Comparative Example 1 | Comparative Example 2 |
|---|---|---|---|
| NR | Part by weight | 50 | 50 |
| BR | Part by weight | 50 | 50 |
| SBR | Part by weight |  |  |
| Carbon black | Part by weight | 60 | 30 |
| Silica 1 | Part by weight |  |  |
| Silica 2 | Part by weight |  | 30 |

TABLE 1-continued

| | | | |
|---|---|---|---|
| Silane coupling agent | Part by weight | | 3 |
| Microcapsules | Part by weight | | |
| Oil | Part by weight | 30 | 30 |
| Tg of diene rubber | ° C. | −87.5 | −87.5 |
| Rubber hardness | — | 52 | 50 |
| M400(S) | MPa | 8.1 | 7.3 |
| Stud pin bottom surface area (A) | mm$^2$ | 48 | 48 |
| Product (S×A) | MPa · mm$^2$ | 389 | 350 |
| Tanδ 0° C. | Index value | 100 | 103 |
| Performance on ice and snow | Index value | 100 | 102 |
| Stud pin pull-out force | N | 146 | 102 |

| | | Comparative Example 3 | Comparative Example 4 | Working Example 1 |
|---|---|---|---|---|
| NR | Part by weight | 20 | 50 | 50 |
| BR | Part by weight | 30 | 50 | 50 |
| SBR | Part by weight | 68.75 (50) | | |
| Carbon black | Part by weight | 30 | 30 | 30 |
| Silica 1 | Part by weight | 30 | 40 | 30 |
| Silica 2 | Part by weight | | | |
| Silane coupling agent | Part by weight | 3 | 3 | 3 |
| Microcapsules | Part by weight | | | |
| Oil | Part by weight | 16 | 17 | 30 |
| Tg of diene rubber | ° C. | −56.0 | −87.5 | −87.5 |
| Rubber hardness | — | 53 | 61 | 50 |
| M400(S) | MPa | 9.1 | 11.2 | 8.2 |
| Stud pin bottom surface area (A) | mm$^2$ | 48 | 48 | 61 |
| Product (S×A) | MPa · mm$^2$ | 437 | 538 | 500 |
| Tanδ 0° C. | Index value | 132 | 97 | 102 |
| Performance on ice and snow | Index value | 84 | 76 | 106 |
| Stud pin pull-out force | N | 177 | 220 | 191 |

| | | Working Example 2 | Working Example 3 | Working Example 4 |
|---|---|---|---|---|
| NR | Part by weight | 50 | 50 | 40 |
| BR | Part by weight | 50 | 50 | 45 |
| SBR | Part by weight | | | 20.63 (15) |
| Carbon black | Part by weight | 5 | 30 | 30 |
| Silica 1 | Part by weight | 60 | 30 | 30 |
| Silica 2 | Part by weight | | | |
| Silane coupling agent | Part by weight | 6 | 3 | 3 |
| Microcapsules | Part by weight | | 5 | |
| Oil | Part by weight | 30 | 30 | 25.9 |
| Tg of diene rubber | ° C. | −87.5 | −87.5 | −78.5 |
| Rubber hardness | — | 48 | 51 | 51 |
| M400(S) | MPa | 7.2 | 7.8 | 8 |
| Stud pin bottom surface area (A) | mm$^2$ | 61 | 61 | 61 |
| Product (S×A) | MPa · mm$^2$ | 439 | 476 | 488 |
| Tanδ 0° C. | Index value | 101 | 101 | 109 |
| Performance on ice and snow | Index value | 111 | 122 | 104 |
| Stud pin pull-out force | N | 184 | 202 | 208 |

The types of raw materials used as in Table 1 are described below.

NR: Natural rubber, STR20 manufactured by BON BUNDIT, glass transition temperature: −65° C.

BR: Butadiene rubber; Nipol BR1220, manufactured by Zeon Corporation, glass transition temperature: −110° C.

SBR: Styrene-butadiene rubber, BUNA VSL 5025-2 manufactured by LANXESS Corporation (oil extended product in which 37.5 parts by weight of oil is blended into 100 parts by weight of rubber), glass transition temperature: −20° C.

Carbon black: Show Black N339 manufactured by Cabot Japan, CTAB adsorption specific surface area: 142 m$^2$/g Silica 1: Silica, ULTRASIL 5000 GR manufactured by Evonic Degussa Corporation, CTAB specific surface area: 125 m$^2$/g Silica 2: Silica, 200MP manufactured by Rhodia, CTAB specific surface area: 200 m$^2$/g Coupling agent: Silane coupling agent, Si69 manufactured by Evonik Degussa Microcapsules: Thermally expandable microcapsules, Microsphere F100 manufactured by Matsumoto Yushi-Seiyaku Co., Ltd.

Oil: Extract No. 4S, manufactured by Showa K.K.

TABLE 2

Common components of the rubber compositions

| | |
|---|---|
| Zinc oxide | 4.0 Part by weight |
| Stearic acid | 2.0 Part by weight |
| Anti-aging agent | 2.0 Part by weight |
| Wax | 2.0 Part by weight |
| Sulfur | 1.5 Part by weight |
| Vulcanization accelerator 1 | 1.5 Part by weight |
| Vulcanization accelerator 2 | 0.2 Part by weight |

The types of raw materials used as indicated in Table 2 are shown below.
Zinc oxide: Zinc Oxide #3 manufactured by Seido Chemical Co., Ltd.
Stearic acid: Beads Stearic Acid YR (manufactured by NOF Corp.)
Anti-aging agent: 6PPD manufactured by Flexsys
Wax: Paraffin wax manufactured by Ouchi Shinko Chemical Industrial Co., Ltd.
Sulfur: Oil-treated sulfur manufactured by Hosoi Chemical Industry Co., Ltd.
Vulcanization accelerator 1: Sauceler CM-G manufactured by Sanshin Chemical Industry Co., Ltd.
Vulcanization accelerator 2: Soxinol D-G manufactured by Sumitomo Chemical Co., Ltd.

The glass transition temperature of the diene rubber of the rubber composition of the studded tire of Comparative Example 3 is higher than −60° C., so the performance on snow and ice is poor.

The rubber hardness of the rubber composition of the studded tire of Comparative Example 4 exceeds 60, so the performance on snow and ice and the wet performance are poor.

As shown in Table 3, test pieces with stud pins combining the rubber compositions shown in Table 1 (Working Examples 1 and 2 and Comparative Examples 2 and 3) and six types of compositions with varying bottom side flange portion areas (Working Examples 5 and 6 and Comparative Examples 5 to 8) were produced. The obtained test pieces with stud pins were used to measure the pull-out force of the stud pins with the method described above.

TABLE 3

| | | Comparative Example 5 Same as in Comparative Example 2 | Comparative Example 6 Same as in Comparative Example 2 | Comparative Example 7 Same as in Comparative Example 3 |
|---|---|---|---|---|
| Type of rubber composition constituting the tread portion | | | | |
| Tg of diene rubber | ° C. | −87.5 | −87.5 | −56.0 |
| Rubber hardness | — | 50 | 50 | 53 |
| M400(S) | MPa | 7.3 | 7.3 | 9.1 |
| Stud pin bottom surface area (A) | mm² | 50 | 61 | 61 |
| Product (S×A) | MPa · mm² | 365 | 445 | 555 |
| Tanδ 0° C. | Index value | 103 | 103 | 132 |
| Performance on ice and snow | Index value | 102 | 102 | 84 |
| Stud pin pull-out force | N | 127 | 185 | 246 |

| | | Comparative Example 8 Same as in Comparative Example 3 | Working Example 5 Same as in Working Example 1 | Working Example 6 Same as in Working Example 2 |
|---|---|---|---|---|
| Type of rubber composition constituting the tread portion | | | | |
| Tg of diene rubber | ° C. | −56.0 | −87.5 | −87.5 |
| Rubber hardness | — | 53 | 50 | 48 |
| M400(S) | MPa | 9.1 | 8.2 | 7.2 |
| Stud pin bottom surface area (A) | mm² | 70 | 50 | 70 |
| Product (S×A) | MPa · mm² | 637 | 410 | 504 |
| Tanδ 0° C. | Index value | 132 | 102 | 101 |
| Performance on ice and snow | Index value | 84 | 106 | 111 |
| Stud pin pull-out force | N | 280 | 173 | 197 |

As is clear from Table 1, it was confirmed that the studded tires of Working Examples 1 to 4 had good wet performance (tan δ at 0° C.) and performance on snow and ice.

As is clear from Table 1, the rubber composition of the studded tire of Comparative Example 2 contains silica 2 having a CTAB specific surface area exceeding 190 m²/g, and the product (S×A) of the stress S and the bottom surface area A is less than 400, so the stud pin pull-out force is poor. The effect of improving the performance on snow and ice is also small.

As is clear from Table 3, it was confirmed that the studded tires of Working Examples 5 and 6 had good wet performance (tan δ at 0° C.) and performance on snow and ice.

In the studded tire of Comparative Example 5, the rubber composition of Comparative Example 2 contains silica 2 having a CTAB specific surface area exceeding 190 m²/g, and the product (S×A) of the stress S and the bottom surface area A is less than 400, so the stud pin pull-out force is poor. The effect of improving the performance on snow and ice is also small.

In the studded tire of Comparative Example 6, the rubber composition of Comparative Example 2 contains silica 2 having a CTAB specific surface area exceeding 190 m²/g, so the effect of improving the performance on snow and ice is small.

In the studded tires of Comparative Examples 7 and 8, the glass transition temperature of the diene rubber of the rubber of the studded tire of Comparative Example 3 is higher than −60° C., so the performance on snow and ice is poor.

The invention claimed is:

1. A studded tire having stud pins embedded in a road contact surface of a tread portion formed from only a rubber composition; the rubber composition comprising a diene rubber containing at least one rubber selected from natural rubber, styrene-butadiene rubber, and butadiene rubber, from 5 to 50 parts by weight of carbon black and a compounded amount of silica of from 5 to 70 parts by weight of silica per 100 parts by weight of the diene rubber; a glass transition temperature of the diene rubber being not higher than −60° C.; a nitrogen adsorption specific surface area of the carbon black being from 50 to 120 m$^2$/g; a CTAB specific surface area of the silica being from 80 to 190 m$^2$/g; a rubber hardness of the rubber composition being not greater than 60; and a product (S×A) of a stress S (MPa) of the rubber composition at the time of 400% elongation and a bottom surface area A (mm$^2$) of a flange portion on a bottom side of the stud pins being not less than 476 and not greater than 850, and
   wherein a pull-out force required to pull out the stud pins from the tread portion rubber composition is not less than 170 N.

2. The studded tire according to claim 1, wherein the rubber composition further comprises from 0.1 to 10 parts by weight of thermally expandable microcapsules per 100 parts by weight of the diene rubber.

3. A studded tire having stud pins embedded in a road contact surface of a tread portion formed from a only a rubber composition; the rubber composition comprising:
   a diene rubber containing at least one rubber selected from natural rubber, styrene-butadiene rubber, and butadiene rubber, from 5 to 50 parts by weight of carbon black and a compounded amount of silica of from 5 to 70 parts by weight of silica per 100 parts by weight of the diene rubber; a glass transition temperature of the diene rubber being not higher than −60° C.; a nitrogen adsorption specific surface area of the carbon black being from 50 to 120 m$^2$/g; a CTAB specific surface area of the silica being from 80 to 190 m$^2$/g; a rubber hardness of the rubber composition being not greater than 60; and a silane coupling agent in an amount from 3 to 15 wt % based on the compounded amount of the silica, and
   a product (S×A) of a stress S (MPa) of the rubber composition at the time of 400% elongation and a bottom surface area A (mm$^2$) of a flange portion on a bottom side of the stud pins being not less than 476 and not greater than 850; and the tread portion of only the rubber composition has a pull-out force required to pull out the stud pins of from 200 to 500 N.

4. The studded tire according to claim 3, wherein the rubber composition further comprises from 0.1 to 10 parts by weight of thermally expandable microcapsules per 100 parts by weight of the diene rubber.

* * * * *